United States Patent [19]
Gilmore

[11] Patent Number: 6,101,105
[45] Date of Patent: Aug. 8, 2000

[54] APPARATUS AND METHOD FOR IDENTIFYING AN UNREGULATED DC BUS VOLTAGE

[75] Inventor: Thomas P. Gilmore, Wauwatosa, Wis.

[73] Assignee: Rockwell Technologies, LLC, Thousand Oaks, Calif.

[21] Appl. No.: 09/329,784

[22] Filed: Jun. 10, 1999

[51] Int. Cl.[7] .................................................. H02M 3/335
[52] U.S. Cl. ................. 363/21; 363/97; 323/902
[58] Field of Search ..................... 363/21, 97; 323/902

[56] References Cited

U.S. PATENT DOCUMENTS

| | | | |
|---|---|---|---|
| 5,373,195 | 12/1994 | De Doncker et al. | ..................... 363/98 |
| 5,483,436 | 1/1996 | Brown et al. | ............................ 363/98 |

*Primary Examiner*—Peter S. Wong
*Assistant Examiner*—Gary L. Laxton
*Attorney, Agent, or Firm*—Michael A. Jaskolski; John J. Horn; William R. Walbrun

[57] ABSTRACT

A method and apparatus for calculating an accurate estimate of an unregulated DC bus voltage to be used with a DC-to-DC converter including a transformer having a primary winding and a secondary winding, the primary winding in series with a switch between the positive and negative rails of the unregulated DC bus voltage, an electrically insulating coupler linked to a switch control line to provide a trigger pulse to a sample and hold circuit, and a sample and hold circuit linked to the transformer secondary winding for measuring the secondary winding voltage when the sample and hold circuit is triggered, the sample and hold circuit providing an output voltage which can be used to calculate the DC bus voltage estimate.

23 Claims, 4 Drawing Sheets

APPARATUS AND METHOD FOR IDENTIFYING AN UNREGULATED DC BUS VOLTAGE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to DC-to-DC converters and more specifically to a method and apparatus for determining the value of an unregulated DC bus voltage in an insulated power system.

As well known in the controls art three phase AC voltage provided by a power station at a single 60 Hz frequency can be rectified using an AC-to-DC rectifier. While useful for some applications, such rectified DC voltage is not suitable for other applications. This is because the magnitude of AC voltage provided to a facility routinely fluctuates due to varying grid usage and other power system occurrences and the fluctuating AC voltages cause the resulting DC voltage to fluctuate. The fluctuating DC voltage is said to be unregulated.

One application for which unregulated DC voltage is unacceptable is powering analog and digital electronics which typically require a regulated (i.e. constant within an acceptable range) voltage source.

Switch-mode DC-to-DC converters are used to convert unregulated DC voltage input into regulated DC voltage output. An exemplary converter includes a transformer including primary and secondary windings, a switch, a regulator and a rectifier/filter circuit.

The regulator is linked to the switch to open and close the switch. The switch and primary form a series pair between positive and negative rails of the unregulated DC bus voltage. The secondary is linked to the rectifier/filter circuit. By opening and closing the switch, current from the unregulated source is provided to, and then cut off from, the primary, resulting in a pulsating voltage across the transformer secondary. The rectifier/filter circuit rectifies the pulsating voltage and filters ripple to provide the regulated DC output voltage. By adjusting the switching duty cycle, the DC output voltage magnitude is adjusted and can be kept constant. This type of DC-to-DC regulator is often used to provide regulated DC power to electronics.

In addition to being converted into a regulated DC voltage for powering electronics, another common use for an unregulated DC bus voltage is to feed a DC-to-AC inverter. Inverters are used to convert DC voltage to controllable frequency and amplitude AC voltage. To this end, a controller is typically provided to control inverter switching in a manner calculated to result in a desired amplitude and frequency.

Modern controllers typically include complex electronic configurations which require a regulated DC bus voltage. Therefore, inverter systems also often include a DC-to-DC converter for converting the unregulated DC voltage to a regulated DC source to power the controller.

To determine how to control an inverter to generate an AC voltage having a desired amplitude and frequency, a typical controller considers a large number of operating parameters. One parameter considered essential to operation of most controllers is the unregulated DC bus voltage magnitude. In effect, it is necessary to know inverter input voltage to determine how to control the inverter to provide a desired output.

As indicated above, unregulated DC bus voltage fluctuates and therefore controllers which consider DC bus voltage magnitude require some mechanism to determine bus voltage. A resistive voltage divider and a differential amplifier have been used in many systems to determine the unregulated DC bus voltage magnitude. The divider circuit solution is relatively inexpensive and works well for many applications.

Despite the advantages of such a simple divider circuit, such circuits cannot be used in certain applications. For example, for safety purposes many applications require an insulated power system wherein the unregulated DC bus voltage is monitored to identify any current leakage which may potentially signal a dangerous condition. When a current leak is sensed, the leak is interpreted as a ground fault and the converter/inverter system is prevented from operating. In an insulated power system, even current loss through a voltage divider circuit is sufficient to prevent the insulated system from operating.

Thus, it would be advantageous to have a method and/or apparatus for determining an unregulated DC voltage magnitude in an insulated power system.

BRIEF SUMMARY OF THE INVENTION

An exemplary embodiment of the invention includes a simple voltage sensing circuit for use with a DC-to-DC converter for accurately estimating the magnitude of an unregulated DC bus voltage. The converter includes, among other things, a transformer having primary and secondary windings, a switch and a regulator. The regulator is linked to the switch via a line to turn the switch on and off. The switch and primary are in series between positive and negative rails of the unregulated DC bus.

The sensor circuit includes an electrically insulating coupler, a voltage sensing circuit and a sampler circuit. The coupler is linked to the regulator and to the sampler circuit and provides a trigger signal to the sampler circuit when the switch is closed. The sampler is linked to the voltage sensing circuit which is linked to the secondary to sense the secondary voltage. When the sampler circuit receives a trigger signal the sampler samples the sensing circuit signal and provides the sampled signal as an output voltage. A processor then uses the output voltage to calculate the unregulated DC bus voltage.

Preferably, the voltage sensing circuit is a resistive voltage divider and the processor calculates by solving the following equation:

$$\hat{V}_{DCI} = V_{OUT} * \frac{N_P}{N_S} * K \qquad \text{Eq. 1}$$

where K is a constant corresponding to the divider.

Thus, one object of the invention is to provide a method and apparatus for estimating an unregulated DC bus voltage in an isolated converter system. This is accomplished by sensing voltage across a transformer secondary and by coupling voltage sensing non-electrically to switch closing.

Another object is to sense the unregulated DC bus voltage inexpensively. To this end, in addition to converter components required to construct a converter, only a coupler, two resistors and a sample and hold circuit are required. By using inverter controller processing power cost is further reduced.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 1:
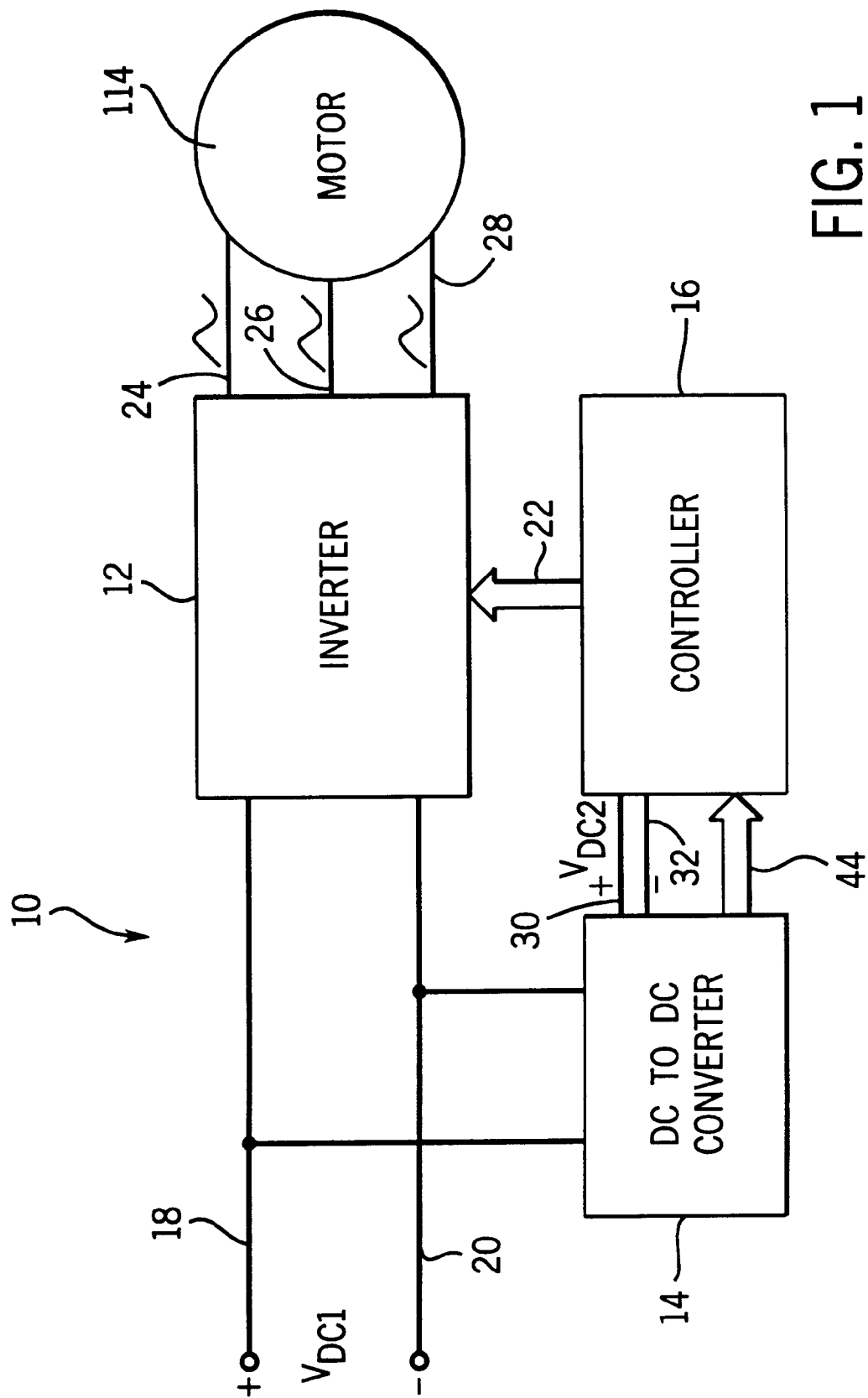
FIG. 1 is a schematic diagram of an exemplary motor control system.

Referring now to FIG. 1, the invention will be described in the context of an exemplary motor control system 10 including inverter 12, motor 14, DC-to- DC converter 14 and inverter controller 16. An unregulated DC bus voltage $V_{DC1}$ to inverter 12 on positive and negative rails 18, 20, respectively. Controller 16 is linked to inverter 12 via a bus 22. As well known in the controls industry, inverter 12 includes a plurality of switches which, under the control of controller 16, convert unregulated DC bus voltage $V_{DC1}$ into three phase AC voltage and current provided to motor 14 via supply lines 24, 26 and 28. By adjusting the amplitude and frequency of the voltages and currents on lines 24, 26 and 28, the speed and other operating parameters of motor 14 can be variably controlled.

In order to operate properly, controller 16 has two primary requirements. First, controller 16 requires a regulated DC power supply. To this end, DC-to-DC converter 14 is linked to rails 18 and 20 and, as described in more detail below, steps DC bus voltage $V_{DC1}$ down to a regulated DC power supply $V_{DC2}$ which is provided on positive and negative rails 30, 32, respectively, to controller 16.

Second, typical controllers 16 require a plurality of signals which indicate instantaneous system operating parameters so that controller 16 can modify inverter 12 operation to cause extremely accurate control of motor 14. To this end, one important system operating parameter which is often required by an exemplary controller 16 is a measurement of unregulated DC bus voltage $V_{DC1}$. When voltage $V_{DC1}$ is relatively high, controller 16 controls inverter 12 in one manner to generate desired AC voltages on lines 24, 26 and 28 and, when DC voltage $V_{DC1}$ is relatively low, controller 16 controls inverter 12 in a second manner to generate the desired voltages on lines 24, 26 and 28.

According to the present invention, in addition to providing regulated DC bus voltage $V_{DC2}$, converter 14 also provides an output voltage signal $V_{OUT}$ to controller 16 via a bus 44 which is used by controller 16 to generate an extremely accurate estimate of DC bus voltage $V_{DC1}$.

Figure 2:
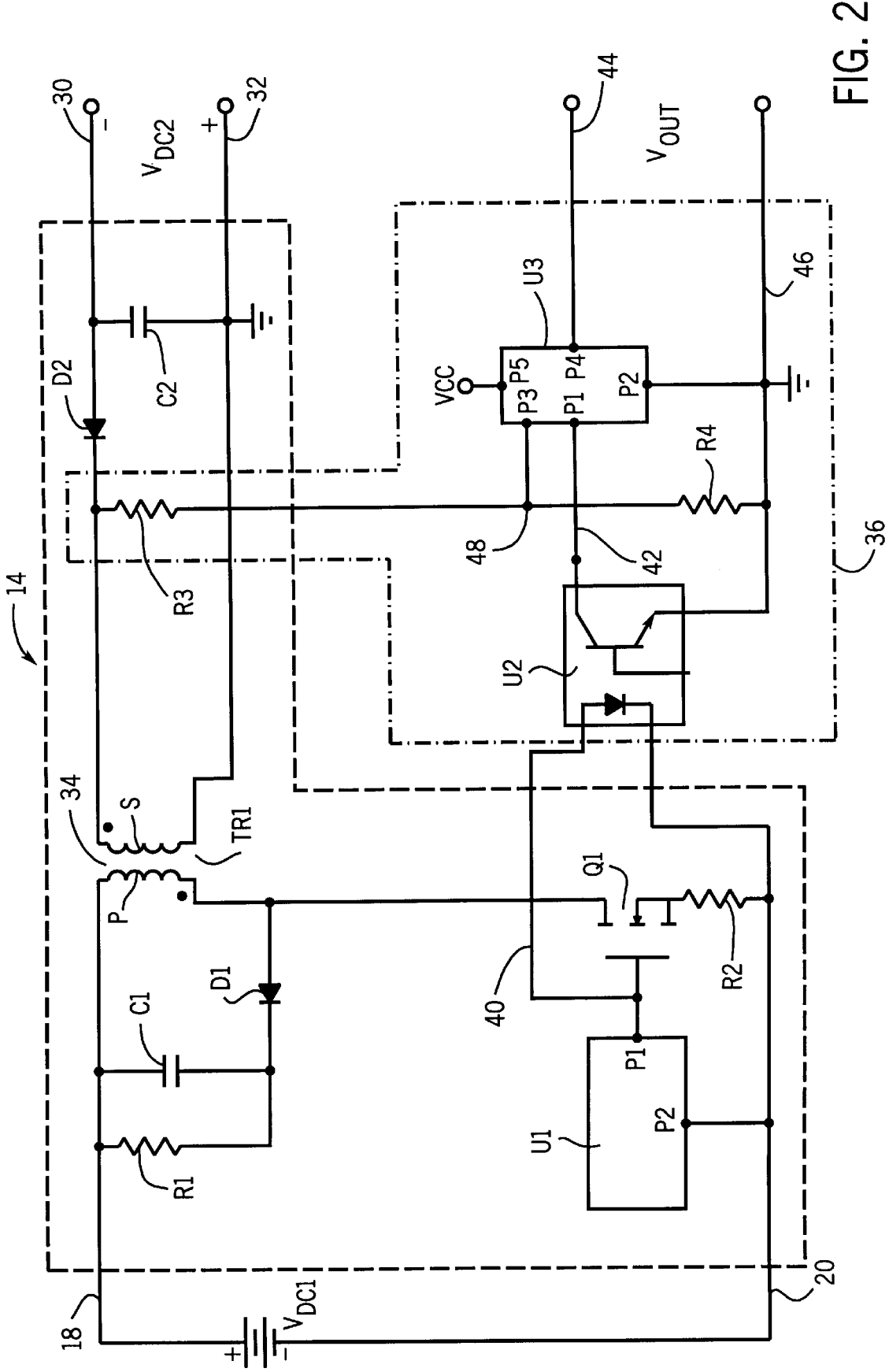
FIG. 2 is a schematic diagram of the converter of FIG. 1.

Referring to FIG. 2, exemplary converter 14 generally includes a converter assembly 34 and a voltage sensing assembly 36. Converter assembly 34 is a standard flyback converter including a transformer TR1, a semiconductor switch Q1, a PWM regulator U1, first and second resistors R1, R2, respectively, first and second capacitors C1 and C2, respectively, and first and second diodes D1 and D2, respectively. Transformer TR1 includes primary and secondary windings P and S, respectively, (hereinafter the primary and secondary, respectively).

Primary P, switch Q1 and resistor R2 are linked in series between unregulated DC bus voltage rails 18 and 20. Diode D1 and capacitor C1 arranged in series across primary P while resistor R1 is in parallel with capacitor C1. Regulator U1 is linked to negative DC bus 20 and is also linked to switch Q1 to open and close switch Q1. Preferably switch Q1 is a semiconductor switch. Secondary S and diode D2 are linked in series across regulated DC bus voltage rails 30 and 32. Capacitor C2 is also linked between busses 30 and 32.

In operation, when switch Q1 is on, the dot end of primary P is negative with respect to its no-dot end and the secondary dot end is positive. Output rectifier diode D2 is reversed biased and all output load currents are supplied from filter capacitor C2. During the Q1 on time, there is a fixed voltage across primary P and current in primary P ramps up quickly. When switch Q1 is turned off, energy stored in the transformer core causes current to flow in secondary windings, the secondary winding current forward biasing diode D2 and therefore providing current to capacitor C2 to charge capacitor C2 and maintain regulated DC voltage $V_{DC2}$. Thus, by opening and closing switch Q1, current pulses are provided to capacitor C2 thereby causing DC bus voltage $V_{DC2}$. By regulating the duty cycle of switch Q1, the average charge on capacitor C2 can be regulated and therefore bus voltage $V_{DC2}$ is also regulated.

Referring still to FIG. 2, voltage sensing circuit 36 includes an electrically isolated coupler U2, third and fourth resistors R3 and R4, respectively, and a sample and hold circuit U3. Electrically isolating coupler U2 is preferably an opticoupler and is linked to the trigger line of PWM regulator U1 via linking line 40. When controller U1 sends a trigger signal to switch Q1, coupler U2 generates a trigger signal on output line 42 which is provided to sample and hold circuit U3.

Sample and hold circuit U3 includes a trigger input P1, an analog sensing input P3 and an output terminal P4. Line 42 is linked to trigger input P1 and, when a trigger signal is received on line 42, sample and hold circuit U3 samples the voltage at terminal P3. The sampled voltage level is provided at output terminal P4 on an output line 44. The output signal on line 44 is maintained or held until another trigger signal is received at terminal P1 thereby causing circuit U3 to again sample the analog input voltage at terminal P3 and update the signal on output terminal P4.

Resistors R3 and R4 are arranged in series between the dot end of secondary S and ground 46. A common node 48 between resistors R3 and R4 is linked to sample and hold circuit input terminal P3. Thus, resistors R3 and R4 operate as a voltage divider providing an analog common node voltage signal $V_{CN}$ to terminal P3.

Operation of voltage sensing circuit 36 is as follows. Sample and hold circuit U3 is synchronized to the transformer TR1 output through switch U2 when the power transistor Q1 is turned on. As described above, at the moment switch Q1 is turned on, as in all flyback type circuits, output diode D2 is reverse biased so that no current flows in the output windings, the unregulated DC bus voltage $V_{DC1}$ is applied to the transformer primary P, current starts to ramp up in primary P thereby causing a voltage across secondary winding S. Immediately upon turning on switch Q1, the voltage across the secondary S accurately reflects the DC bus voltage $V_{DC1}$ when the transformer TR1 turns ratio is accounted for.

Upon turning on switch Q1, if the voltage sensing circuit 36 samples a transformer output before primary P the currents ramps to a high value, a very accurate measurement of unregulated DC bus voltage $V_{DC1}$ can be made. To this end, when Q1 turns on, coupler U2 provides a trigger signal to input P1 thereby causing sample and hold circuit U3 to sample voltage $V_{CN}$ at common node 48 providing the sample voltage on output line 44.

When controller 16 receives output voltage $V_{OUT}$, controller 16 mathematically combines the output voltage $V_{OUT}$ with a transformer turns ratio and a resistive voltage dividing ratio which correspond to transformer TR1 and resistors R3 and R4, respectively, and which are known. To this end, controller 16 estimates the instantaneous unregulated DC bus voltage $V_{DC1}$ by solving the following equation:

$$\hat{V}_{DC1} = V_{OUT} * \frac{N_P}{N_S} * \frac{R3 + R4}{R4} \qquad \text{Eq. 1}$$

wherein $N_P/N_S$ is the transformer turns ratio and $(R3+R4)/R4$ is the voltage dividing resistive ratio corresponding to resistors R3 and R4. In this manner, converter 14 and controller 16 cooperate to generate an extremely accurate unregulated DC bus voltage $V_{DC1}$ estimate for control purposes.

Figure 3:
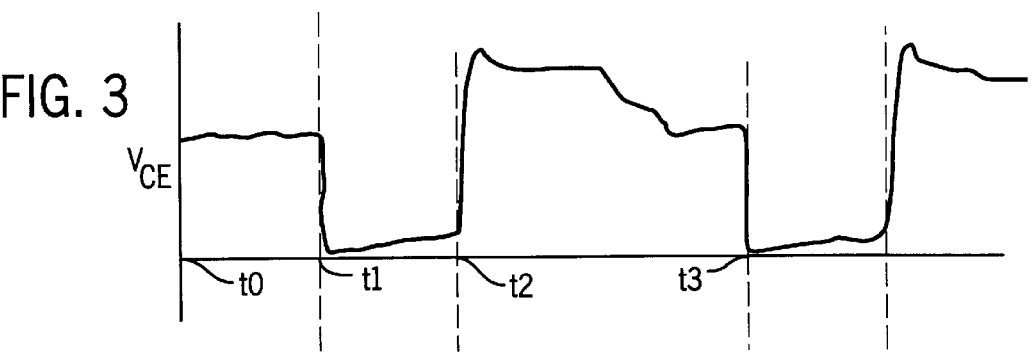
FIG. 3 is a graph illustrating the voltage across switch Q1 in FIG. 2.
Figure 4:
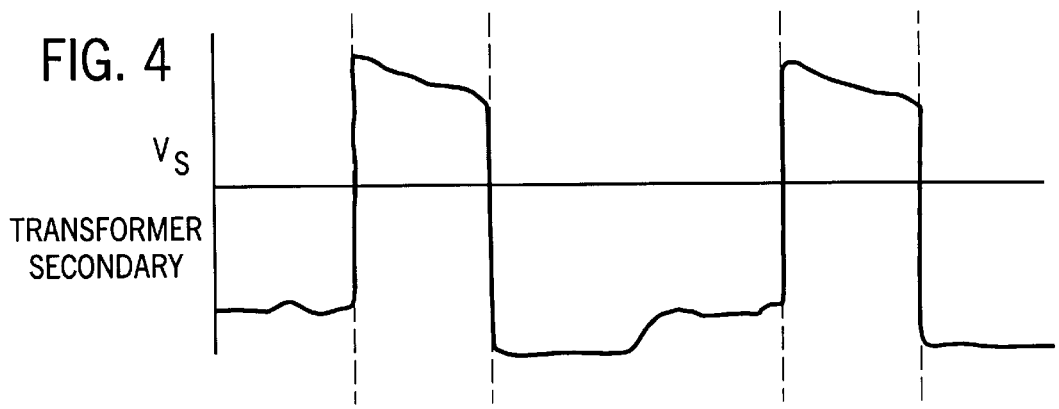
FIG. 4 is a graph illustrating the voltage across the secondary winding of FIG. 2.
Figure 5:
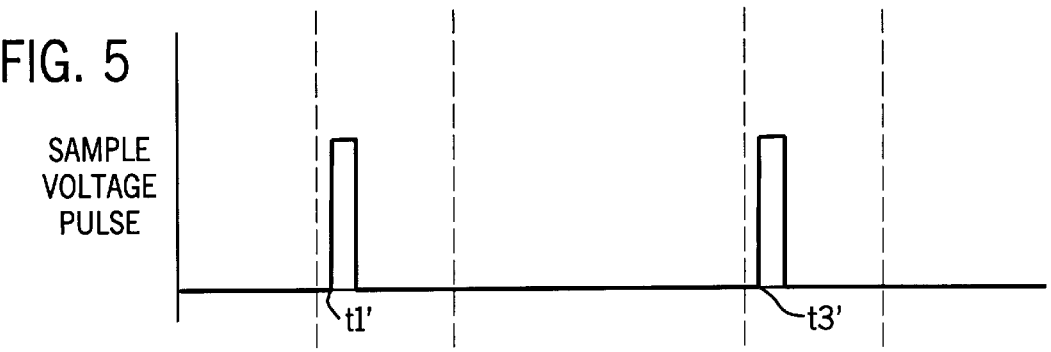
FIG. 5 is a graph illustrating sample voltage pulses $V_{CN}$ sampled by the sample and hold circuit of FIG. 2.
Figure 6:
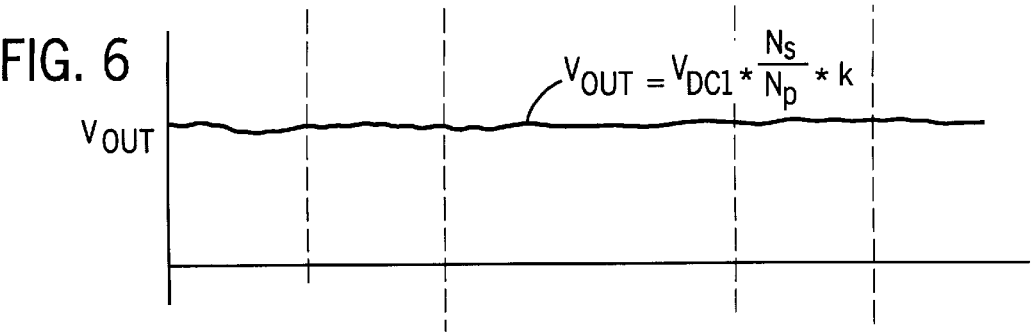
FIG. 6 is a graph illustrating an exemplary output voltage $V_{OUT}$ of FIG. 2.

Referring now to FIGS. 2 and also 3 through 6, various voltage waveforms are illustrated in FIGS. 3 through 6 which correspond to the converter of FIG. 2 during system operation. To this end, FIG. 3 represents the voltage across switch Q1, FIG. 4 represents the voltage across secondary S, FIG. 5 represents the sample voltage sampled at sample and hold circuit input P3 and FIG. 6 represents the output voltage $V_{OUT}$ on output line 44.

Between times t0 and t1, switch Q1 is off or open. At time t1 switch Q1 is closed or turned on. Although not illustrated in FIGS. 3–6, when switch Q1 is turned on the unregulated DC bus voltage $V_{DC1}$ is provided across primary winding P thereby causing current to rise in primary winding P. The change in current with respect to time through primary P causes voltage $V_S$ across secondary S as illustrated in FIG. 4. Initially, just after time t1, current in the primary is low, secondary current is zero and therefore errors due to IR drop in the primary and secondary are low.

Referring still to FIGS. 2 through 6, at time t1', just after time t1, opticoupler U2 causes sample and hold circuit U3 to sample voltage $V_{CN}$ at node 48 which reflects the secondary voltage $V_S$ through voltage dividing resistors R3 and R4. Circuit U3 only samples the voltage at node 48 for a short time and provides the output voltage $V_{OUT}$ (see FIG. 6) at output line 44.

At time t2 switch Q1 is again opened or turned off and remains off until time t3. At time t3, when switch Q1 is again turned on, once again voltage $V_S$ occurs across secondary winding S and instantaneously reflects the unregulated DC bus voltage $V_{DC1}$. At time t3', coupler U2 again causes sample and hold circuit U3 to sample voltage $V_{CN}$ at node 48 providing the sampled voltage on output line 44.

It should be appreciated that a simple voltage sensing circuit has been described for sensing an unregulated DC bus voltage $V_{DC1}$. It should also be appreciated that the inventive sensing circuit is relatively inexpensive, taking advantage of hardware required for a DC-to-DC converter to isolate the sensor from the unregulated DC bus voltage.

Figure 7:
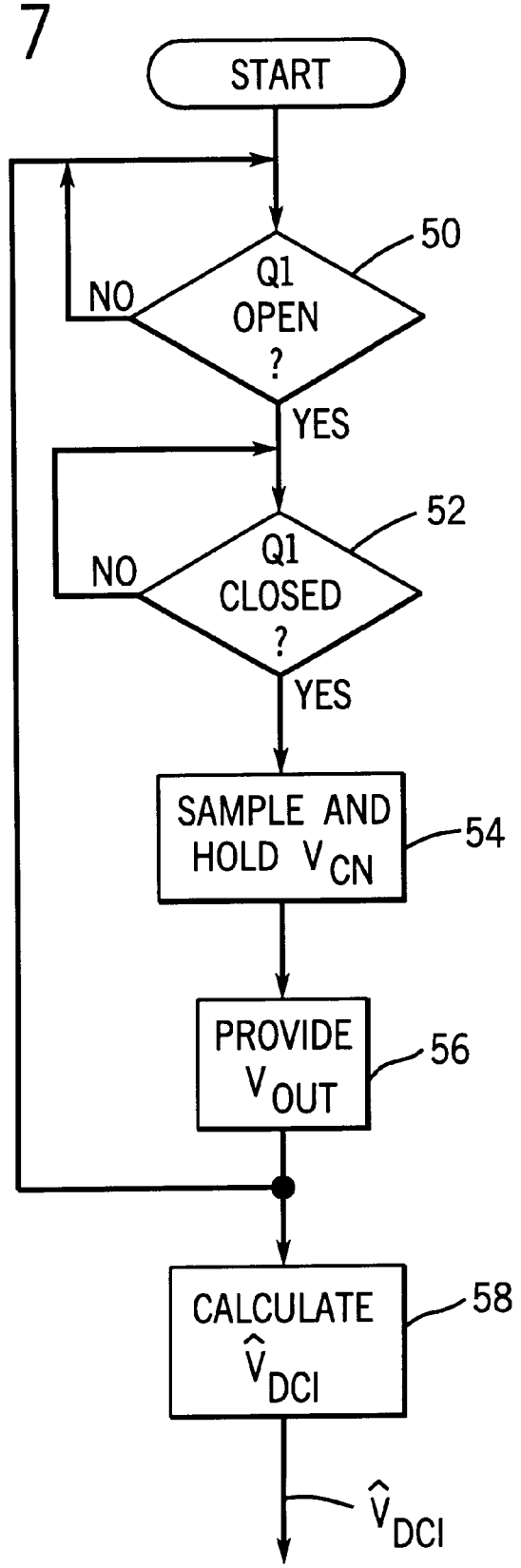
FIG. 7 is a flow chart illustrating a preferred inventive method.

In addition to the inventive apparatus described above, the invention also includes an inventive method illustrated in FIG. 7. Referring to FIGS. 2 and 7, decision blocks 50 and 52 represent operation of opticoupler U2. At decision block 50, if Q1 is initially closed, control loops back through decision block 50 until switch Q1 is opened. After switch Q1 opens, at decision block 52, while switch Q1 remains open control continuously loops through decision block 52 and coupler U2 does not provide a signal on line 42. When switch Q1 is turned on and closes, at decision block 52, coupler U2 provides a trigger signal on line 42 causing circuit U3 to sample the common node voltage $V_{CN}$ at node 48. This occurs at process block 54. At block 56, output voltage $V_{OUT}$ is provided on line 44 and then control of coupler U2 and sample and hold circuit U3 loops again up to decision block 50. At process block 58 controller 16 (see FIG. 1) calculates the estimated unregulated DC bus voltage $V_{DC1}$ according to Equation 1 above.

It should be understood that the methods and apparatuses described above are only exemplary and do not limit the scope of the invention, and that various modifications could be made by those skilled in the art that would fall under the scope of the invention. For example, while the invention is described in the context of a flyback converter, it is contemplated that the inventive voltage sensing circuit could be employed in other types of DC-to-DC converter configurations including forward converter, a buck converter, a boost converter and so on.

To apprise the public of the scope of the present invention the following claims are made.

What is claimed is:

1. An apparatus for calculating the unregulated DC bus voltage of a DC-to-DC voltage converter, the converter including, among other things, a transformer having a primary and a secondary, a switch linked in series with the primary, and a regulator for opening and closing the switch, the unregulated DC bus voltage provided in series with the primary and switch, the apparatus comprising:

a voltage sensor linked to the secondary to measure the voltage across the secondary, the sensor providing a voltage signal;

a sampler circuit linked to the voltage sensor for sampling the voltage signal when a trigger signal is received, the sampler circuit providing an output signal at an output terminal; and an electrical isolating coupler linked to the converter for sensing when the switch closes and providing the trigger signal to the sampler circuit when the switch closes.

2. The apparatus of claim 1 wherein the coupler is linked to the regulator.

3. The apparatus of claim 1 wherein the converter is a flyback converter.

4. The apparatus of claim 1 wherein the coupler is an opticoupler.

5. The apparatus of claim 1 wherein the sampler is a sample and hold circuit which, after a sensor signal is sampled, provides the sampled signal as the output signal until the sensor signal is again sampled.

6. The apparatus of claim 1 wherein the sensor includes two resistive elements linked between the secondary and a ground, and wherein a common node between the resistive elements in linked to the sampler circuit for sampling.

7. The apparatus of claim 1 further including a controller which receives and uses the output signal to calculate a bus voltage estimate of the unregulated DC bus voltage.

8. The apparatus of claim 7 wherein the controller calculates by solving the following equation:

$$\hat{V}_{DCI} = V_{OUT} * \frac{N_P}{N_S} * \frac{R3 + R4}{R4}$$

where $V_{OUT}$ is the output signal, Np/Ns is the primary/secondary turns ratio and (R3+R4)/R4 is a constant associated with the voltage sensor.

9. The apparatus of claim 8 wherein the sensor includes two resistive elements linked between the secondary and a ground, and wherein a common node between the resistive elements in linked to the sampler circuit for sampling.

10. The apparatus of claim 7 wherein the controller an inverter controller for controlling a DC-to-AC inverter.

11. The apparatus of claim 1 wherein the switch is a semiconductor switch.

12. An apparatus for measuring the magnitude of an unregulated DC bus voltage, the apparatus comprising:
a transformer including a primary winding and at least one secondary winding;
a switch in series with the primary, the series switch and primary linked in series with the unregulated bus voltage;
a regulator linked to the switch to open and close the switch;
a voltage sensor linked to the secondary to measure the voltage across the secondary, the sensor providing a voltage signal;
a sampler circuit linked to the voltage sensor for sampling the voltage signal when a trigger signal is received, the sampler circuit providing an output signal at an output terminal; and
an electrical isolating coupler linked to the regulator for sensing when the switch closes and providing the trigger signal to the sampler circuit when the switch closes.

13. The apparatus of claim 12 wherein, among other components, the transformer, and switch form a converter for providing a regulated DC voltage.

14. The apparatus of claim 12 wherein the coupler is an opticoupler which is linked to the regulator.

15. The apparatus of claim 12 wherein the sampler is a sample and hold circuit which, after a sensor signal is sampled, provides the sampled signal as the output signal until the sensor signal is sampled.

16. The apparatus of claim 12 wherein the sensor includes two resistive elements linked between the secondary and a ground, and wherein a common node between the resistive elements is linked to the sampler circuit for sampling.

17. The apparatus of claim 12 further including a controller which receives and uses the output signal to calculate a bus voltage estimate of the unregulated bus voltage.

18. The apparatus of claim 17 wherein the controller calculates by solving the following equation:

$$\hat{V}_{DCI} = V_{OUT} * \frac{N_P}{N_S} * K$$

where $V_{OUT}$ is the output signal, Np/Ns is the primary/secondary turns ratio and K is a constant associated with the voltage sensor.

19. The apparatus of claim 18 wherein the sensor includes two resistive elements is linked between the secondary and a ground, and wherein a common node between the resistive elements linked to the sampler circuit for sampling and, wherein, K is a resistor ratio.

20. The apparatus of claim 18 wherein the controller is an inverter controller for controlling a DC-to-AC inverter.

21. A method for determining the magnitude of an unregulated DC bus voltage which is in series with a transformer primary and switch, the transformer also including a secondary, the method comprising the steps of:
with the switch initially open, closing the switch;
sampling the voltage across the secondary when the switch is closed to generate a voltage signal; and
using the voltage signal to determine the unregulated DC bus voltage.

22. The method of claim 21 wherein the step of using the voltage signal to determine the unregulated DC bus voltage includes mathematically combining the voltage signal and a transformer turns ratio.

23. The method of claim 22 wherein the step of mathematically combining includes the step of solving the following equation:

$$\hat{V}_{DCI} = V_{OUT} * \frac{N_P}{N_S} * \frac{R3 + R4}{R4}$$

where $V_{OUT}$ is the output voltage, Np/Ns is the transformer turns ratio and (R3+R4)/R4 is a constant associated with the sampling step.

* * * * *